United States Patent
Nakajima et al.

(10) Patent No.: US 9,597,723 B2
(45) Date of Patent: Mar. 21, 2017

(54) TUBE EXPANSION METHOD

(71) Applicant: MITSUBISHI HEAVY INDUSTRIES, LTD., Tokyo (JP)

(72) Inventors: Nobutaka Nakajima, Tokyo (JP); Yoshinori Okamura, Tokyo (JP); Takahisa Hasegawa, Tokyo (JP); Hirokazu Kadowaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 366 days.

(21) Appl. No.: 14/387,413

(22) PCT Filed: Nov. 28, 2012

(86) PCT No.: PCT/JP2012/080781
§ 371 (c)(1),
(2) Date: Sep. 23, 2014

(87) PCT Pub. No.: WO2013/145442
PCT Pub. Date: Oct. 3, 2013

(65) Prior Publication Data
US 2015/0082606 A1 Mar. 26, 2015

(30) Foreign Application Priority Data
Mar. 29, 2012 (JP) ................. 2012-077916

(51) Int. Cl.
*B21D 39/20* (2006.01)
*B21D 39/06* (2006.01)
(Continued)

(52) U.S. Cl.
CPC ............. *B21D 39/20* (2013.01); *B21D 39/06* (2013.01); *F22B 1/025* (2013.01); *F22B 37/50* (2013.01);
(Continued)

(58) Field of Classification Search
CPC ..... B26D 3/16–3/169; Y10T 29/49938; Y10T 29/531; Y10T 29/49968;
(Continued)

(56) References Cited

U.S. PATENT DOCUMENTS 2,749,809 A * 6/1956 Anderson ................. B23B 3/24
408/80
4,934,038 A * 6/1990 Caudill .................. B21D 39/08
29/523

(Continued)

FOREIGN PATENT DOCUMENTS

FR 2411052 A * 12/1977
JP 3-51600 A 3/1991
(Continued)

OTHER PUBLICATIONS

EIC Search strategy, Oct. 31, 2016. Includes Abstracts of: JP-2011102697, JP-4808757, JP-2008253928, JP2012231969. FR2411052.*

(Continued)

*Primary Examiner* — David Bryant
*Assistant Examiner* — Lawrence Averick
(74) *Attorney, Agent, or Firm* — Westerman, Hattori, Daniels & Adrian, LLP (57) ABSTRACT

A tube expansion method of mounting a drain tube as tube member by insertion and expansion to a through hole in which opening portions at both ends are obliquely formed, the method including: inserting the drain tube to the through hole so that the end portions protrude from the opening portions at both ends of the through hole; inserting a tube expander into the drain tube to expand the drain tube up to a predetermined inner diameter while moving the tube expander to the other end portion from one end portion of the drain tube; cutting each end portion of the tube member (Continued)

protruding from each opening portion of the through hole along an oblique shape of each opening portion; and welding the cut end portion of the drain tube and the opening portion of the through hole.

5 Claims, 9 Drawing Sheets (51) Int. Cl.
| | | |
|---|---|---|
| *G21D 1/00* | (2006.01) | |
| *F22B 37/50* | (2006.01) | |
| *F22B 1/02* | (2006.01) | |
| *F22B 37/02* | (2006.01) | |

(52) U.S. Cl.
CPC ............... *G21D 1/006* (2013.01); *Y02E 30/40* (2013.01); *Y10T 29/4994* (2015.01)

(58) Field of Classification Search
CPC .......... Y10T 29/49995; Y10T 29/4994; B21D 39/20; B21D 39/06; F22B 1/025; F22B 37/50; G21D 1/006; Y02E 30/40
USPC ............................................................ 83/52
See application file for complete search history.

(56) References Cited

U.S. PATENT DOCUMENTS

| | | | | |
|---|---|---|---|---|
| 5,091,140 A * | 2/1992 | Dixon | ............... | G21C 1/09 |
| | | | | 376/203 |
| 5,201,118 A * | 4/1993 | McParland | ............. | B21D 39/06 |
| | | | | 29/402.16 |
| 5,274,683 A * | 12/1993 | Broda | ............. | G21C 1/09 |
| | | | | 29/890.031 |
| 5,743,241 A * | 4/1998 | Wood | ............. | F02M 23/001 |
| | | | | 123/531 |
| 5,802,125 A * | 9/1998 | Fife | ............. | G21C 13/036 |
| | | | | 277/606 |
| 6,188,741 B1 * | 2/2001 | Ballas | ............. | G21C 13/028 |
| | | | | 228/184 |
| 6,834,092 B2 * | 12/2004 | Willis | ............. | G21C 13/036 |
| | | | | 29/402.07 |
| 9,180,557 B1 * | 11/2015 | Graves | ............. | B23P 6/00 |
| 2002/0157235 A1 * | 10/2002 | Napolitano, Jr. | ...... | B21D 39/02 |
| | | | | 29/505 |
| 2005/0135537 A1 * | 6/2005 | Hinton | ............. | G21C 13/036 |
| | | | | 376/205 |
| 2005/0190877 A1 * | 9/2005 | Knapp | ............. | G21C 13/036 |
| | | | | 376/203 |
| 2006/0284432 A1 * | 12/2006 | Hashimoto | ............. | B21D 39/06 |
| | | | | 293/154 |
| 2007/0031591 A1 * | 2/2007 | Junker | ............. | C23C 24/04 |
| | | | | 427/140 |
| 2007/0053740 A1 * | 3/2007 | Herrmann | ............. | B21D 39/06 |
| | | | | 403/52 |
| 2009/0199402 A1 * | 8/2009 | Muroya | ............. | B21D 39/06 |
| | | | | 29/890.036 |
| 2010/0193123 A1 * | 8/2010 | Kawamata | ............. | B21D 39/06 |
| | | | | 156/293 |
| 2011/0194663 A1 * | 8/2011 | Hori | ............. | F16L 5/022 |
| | | | | 376/204 |
| 2014/0123456 A1 * | 5/2014 | Newton | ............. | G21C 13/036 |
| | | | | 29/402.08 |
| 2015/0047194 A1 * | 2/2015 | Ishigami | ............. | G21D 1/006 |
| | | | | 29/890.053 |
| 2015/0325319 A1 * | 11/2015 | Nishimura | ............. | G21C 19/02 |
| | | | | 376/204 |

FOREIGN PATENT DOCUMENTS

| | | | |
|---|---|---|---|
| JP | 10-103609 A | | 4/1998 |
| JP | 2005-152920 A | | 6/2005 |
| JP | 2006-110609 A | | 4/2006 |
| JP | 2008253928 A | * | 10/2008 |
| JP | 2011102697 A | * | 5/2011 |
| JP | 4808757 B2 | * | 11/2011 |
| JP | 2012231969 A | * | 11/2012 |

OTHER PUBLICATIONS

Official Communication under Rule 71(3) EPC, dated Mar. 17, 2016, issued in counterpart European Patent Application No. 12872411.9. (39 pages).

International Search Report dated Feb. 26, 2013 issued in corresponding application No. PCT/JP2012/080781.

Written Opinion of the International Searching Aurthority dated Feb. 26, 2013 issued in corresponding application No. PCT/JP2012/080781.

Notice of Allowance dated Jul. 14, 2015, issued in counterpart Japanese Application No. 2012-077916, with English translation. (2 pages).

Translation of Written Opinion of the International Searching Authority dated Feb. 26, 2013 issued in corresponding application No. PCT/JP2012/080781.

* cited by examiner

TUBE EXPANSION METHOD

FIELD

The present invention relates to, for example, a tube expansion method used when a drain tube that forms a drain hole in a channel head of a steam generator is mounted to a through hole of the channel head.

BACKGROUND

For example, in a steam generator of a pressurized water reactor (PWR), primary cooling water in a water chamber is evacuated at the time of maintenance or the like. At this time, since the channel head forming the water chamber is formed in a bowl shape, in some cases, the primary cooling water remains in the bottom thereof or the primary cooling water remains in a lid of a manhole. Thus, the channel head is formed with a drain hole leading to the bottom side of the channel head from the manhole, and a drain hole leading to a nozzle from the bottom of the channel head (for example, see Patent Literature 1). The drain hole is configured so that a drain tube made of a corrosion-resistant material is inserted and mounted to the through hole formed in the channel head in consideration of corrosion resistance.

CITATION LIST

Patent Literature

Patent Literature 1: Japanese Patent Application Laid-open No. 10-103609

SUMMARY

Technical Problem

As described above, the drain hole is fixed by inserting the drain tube as a tube member through the through hole formed in the channel head, and by welding both ends of the drain tube. In such a configuration, thermal stress occurs due to a different in linear expansion coefficient between the channel head and the drain tube along with a temperature rise when using the steam generator, and there is a risk of damage to a welding portion by expansion of air of a gap between the through hole and the drain tube. For that reason, the gap between the through hole and the drain tube is eliminated by expanding the drain tube.

However, as described above, since the channel head is formed in a bowl shape and the manhole and the nozzle are formed obliquely with respect to the channel head, the opening portions at both ends of the drain hole are oblique to the axis center to conform to the oblique shape. For this reason, the opening portions at both ends of the through hole are similarly formed obliquely with respect to the axis center. Therefore, it is preferable to uniformly expand the drain tube in a radial direction, by inserting a tube expander in the axial direction, but it is difficult to perform such an operation in an opening portion of the through hole.

The present invention has been made to solve the above-described problem, and an object thereof is to provide a tube expansion method that is able to expand a tube member in which the opening portion is inserted into the through hole of the oblique shape with respect to the axis center in a suitable state.

Solution to Problem

According to a first aspect of the present invention, there is provided a tube expansion method of mounting a tube member, by insertion and expansion, to a through hole in which opening portions at both ends are formed obliquely with respect to an axis center, the method including: an insertion step of inserting the tube member to the through hole so that end portions protrude from the opening portions at both ends of the through hole; a tube expansion step of inserting a tube expander into the tube member to expand the tube member up to a predetermined inner diameter while moving the tube expander to the other end portion from one end portion of the tube member; a cutting step of cutting each of the end portions of the tube member protruding from each of the opening portions of the through hole along an oblique shape of each of the opening portions; and a welding step of welding the cut end portions of the tube member and the opening portions of the through hole.

According to the tube expansion method, by performing the tube expansion by the tube expander in a state of causing the end portion of the tube member to project from the opening portions at both ends of the through hole, it is possible to apply a tube expansion force of uniformly expanding in the radial direction to the tube member in which the opening portion is inserted into the through hole of the oblique shape with respect to the axis center. As a result, it is possible to expand the tube member in which the opening portion is inserted into the through hole of the oblique shape with respect to the axis center in a suitable state.

According to a second aspect of the present invention, there is provided the tube expansion method according to the first aspect, further including: a fixing step of fixing at least one end portion of the tube member protruding from each opening portion of the through hole, between the insertion step and the tube expansion step.

According to the tube expansion method, it is possible to prevent a situation in which the tube member is moved by rotational force of the tube expander and driving force in the axial direction, during the tube expansion.

According to a third aspect of the present invention, there is provided the tube expansion method according to the second aspect, wherein, in the fixing step, one end surface fits the oblique shape of the opening portion of the through hole, the other end surface is orthogonal to the axis center of the through hole, and by using a fixing jig to which the end portions of the tube member protruding from each opening portion of the through hole are inserted, one end surface of the fixing jig is welded to an opening edge side of the through hole, and the tube member is welded to the other end surface side of the fixing jig.

According to the tube expansion method, it is possible to suitably fix the tube member using a fixing jig.

According to a fourth aspect of the present invention, there is provided the tube expansion method according to the third aspect, wherein the fixing jig is dividedly formed so as to interpose the end portions of the tube member protruding from each opening portion of the through hole, and the tube member is welded to the opening edge side of the through hole while interposing the tube member between the divided fixing jig.

According to the tube expansion method, even if there is a dimensional error in the diameter of the tube member, it is possible to easily perform the arrangement of the fixing jig with respect to the tube member.

According to a fifth aspect of the present invention, there is provided the tube expansion method according to the third or fourth aspect, wherein, in the fixing step, the other end surface of the fixing jig is fitted to the end surface of one end portion of the tube member to which the tube expander is inserted.

According to the tube expansion method, since all portions of the tube member protruding from the through hole are pressed by the fixing jig, it is possible to prevent a situation in which one end portion of the tube member is deformed during tube expansion using the tube expander, and it is possible to smoothly move the tube expander in the axial direction. As a result, it is possible to obtain a remarkable effect of expanding the tube member in a suitable state.

Advantageous Effects of Invention

According to the present invention, it is possible to expand the tube member in which the opening portion is inserted into the through hole of the oblique shape with respect to the axis center in a suitable state.

DESCRIPTION OF EMBODIMENTS

An embodiment according to the present invention will be described below in detail with reference to the drawings. It is not intended that the invention be limited by the embodiments. Furthermore, components in the embodiment described below include components that are easily replaceable by those skilled in the art or substantially the same components.

Figure 10:
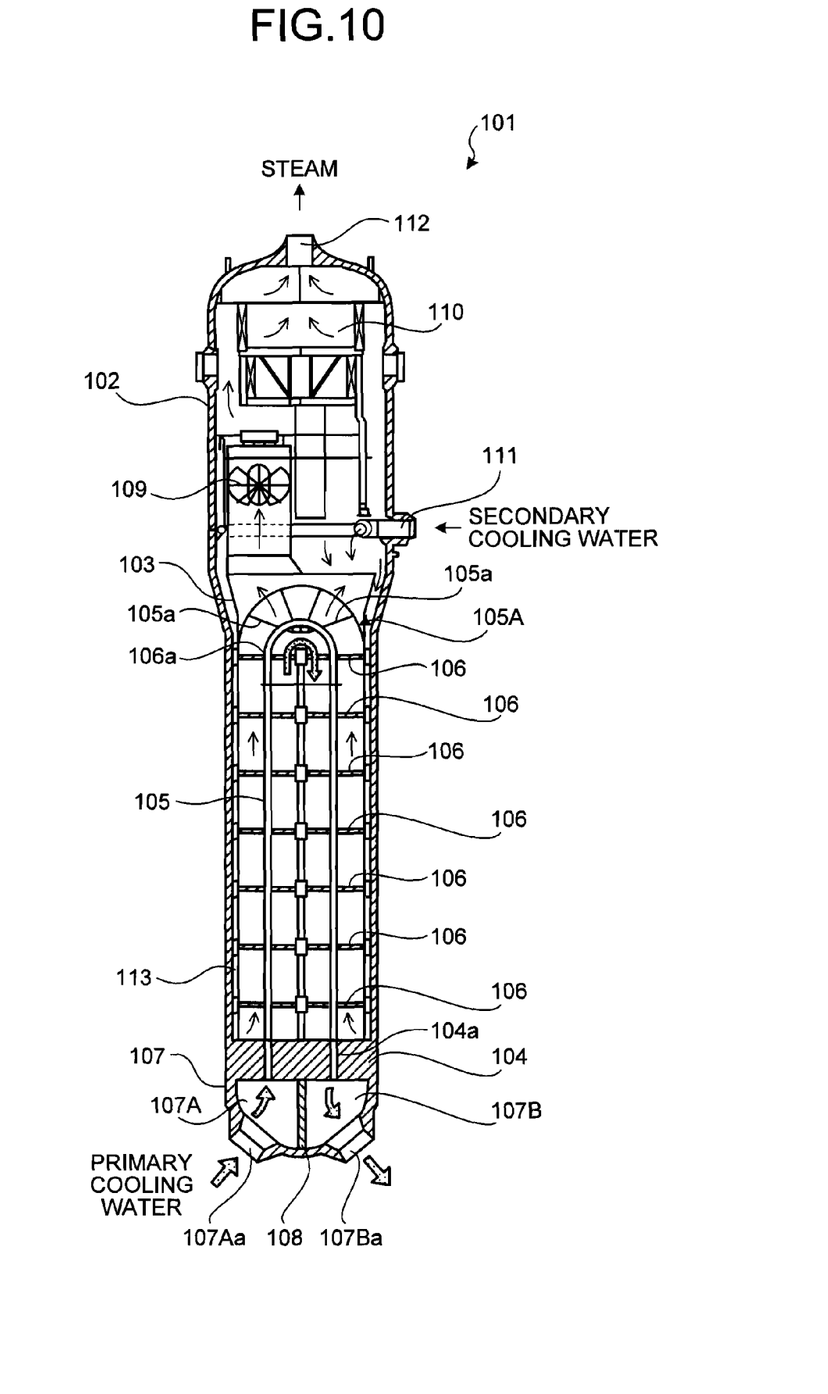
FIG. 10 is an explanatory view illustrating a configuration of a steam generator.
Figure 11:
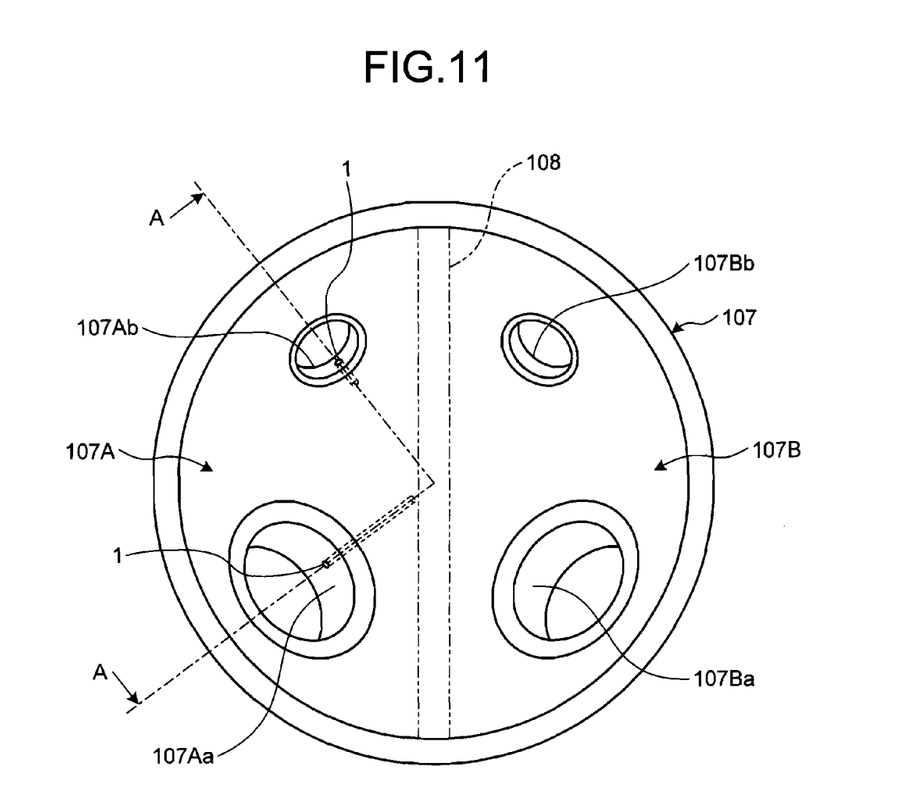
FIG. 11 is a plan view of a steam generator channel head to which the tube expansion method according to the embodiment of the present invention is applied.
Figure 12:
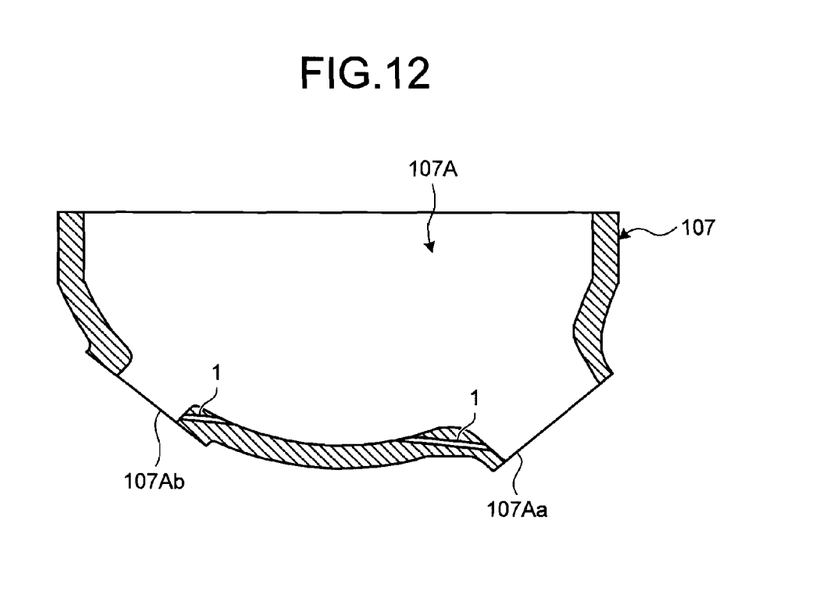
FIG. 12 is a cross-sectional view taken from a line A-A of FIG. 11.
Figure 13:
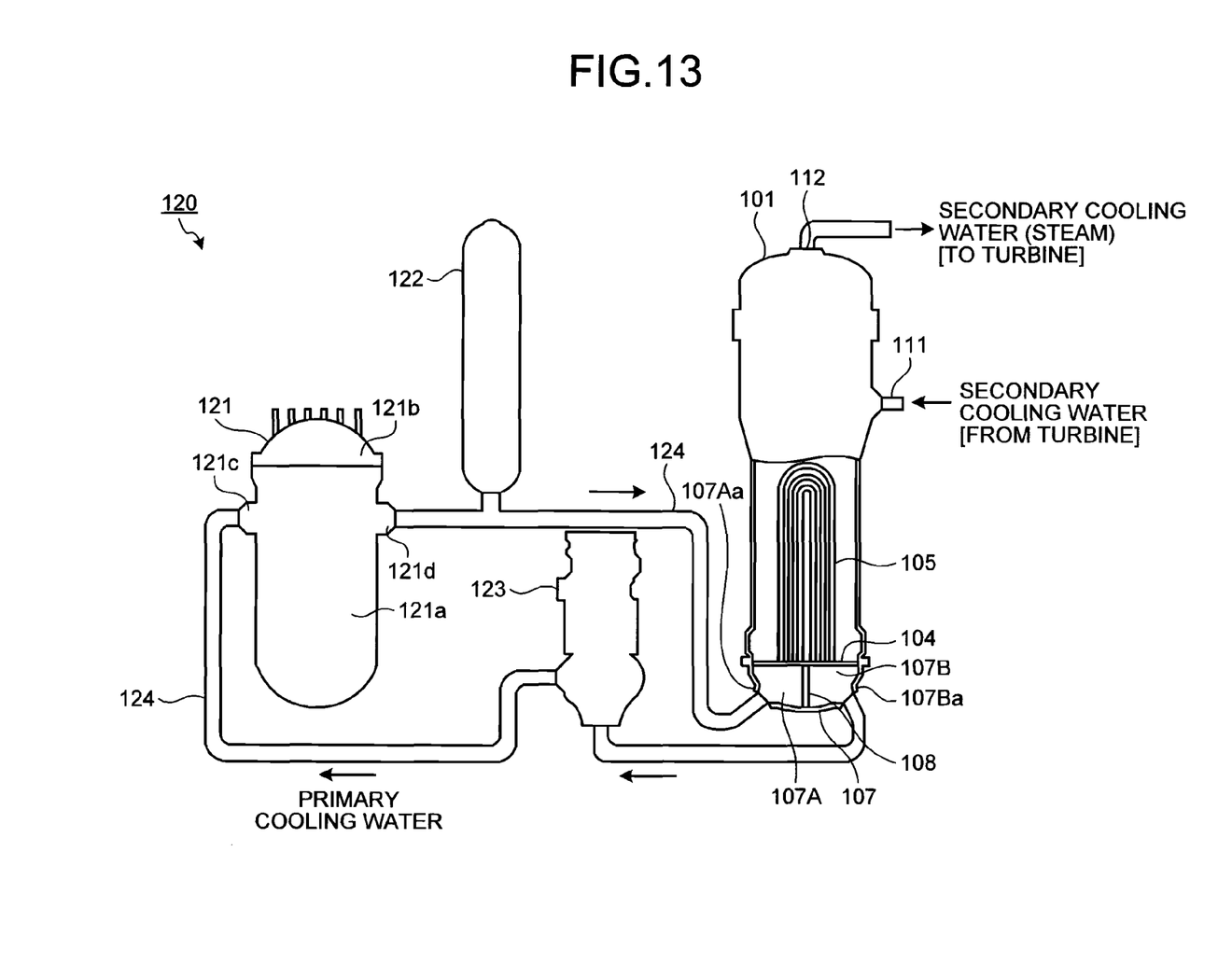
FIG. 13 is a schematic diagram illustrating an example of a nuclear power apparatus to which the steam generator is applied.

FIG. 10 is an explanatory view illustrating a configuration of a steam generator, FIG. 11 is a plan view of a channel head of the steam generator to which a tube expansion method according to the present embodiment is applied, FIG. 12 is a cross-sectional view taken from a line A-A of FIG. 11, and FIG. 13 is a schematic diagram illustrating an example of a nuclear power apparatus to which the steam generator is applied.

As illustrated in FIG. 10, a steam generator 101 has a body portion 102. The body portion 102 extends in the vertical direction and has a closed hollow cylindrical shape, and a lower half portion thereof has a diameter slightly smaller than that of an upper half portion. In the lower half portion of the body portion 102, a tube bundle shroud 103 having a cylindrical shape disposed at a predetermined distance from an inner wall surface of the body portion 102 is provided. A lower end portion of the tube bundle shroud 103 extends to the vicinity of a tube plate 104 disposed below the lower half portion of the body portion 102. A heat transfer tube group 105A is provided in the tube bundle shroud 103. The heat transfer tube group 105A includes a plurality of heat transfer tubes 105 having an inverted U-shape. The above-described inverted U-shaped circular arc portion of the heat transfer tube 105 is disposed at an upper end portion of the heat transfer tube group 105A. The heat transfer tube 105 constitutes a heat transfer tube layer in which the large-diameter circular arc portions are arranged outward from the center, and by changing the diameter of the heat transfer tube layer while overlapping, the upper end portion of the heat transfer tube group 105A is formed in a hemispherical shape. Between the circular arc portions of each heat transfer tube layer, the hemispherical portion of the heat transfer tube group 105A is provided with a vibration suppression member 105a for suppressing fluid-induced vibration that may occur when the primary cooling water passes through the heat transfer tube 105 is provided. Moreover, the lower end portion of each heat transfer tube 105 is inserted and supported into a tube hole 104a of the tube plate 104 while the U-shaped circular arc portion faces upward, and the intermediate portion thereof is supported by the tube bundle shroud 103 via a plurality of tube support plates 106. The tube support plates 106 are formed with a large number of tube holes 106a, and support each heat transfer tube 105 by inserting each heat transfer tube 105 into the tube holes 106a.

A channel head 107 is joined to the lower end portion of the body portion 102. As illustrated in FIGS. 10 to 12, the interior of the channel head 107 is divided into an inlet side water chamber 107A and an outlet side water chamber 107B by a partition plate 108, in a state in which an opening edge formed in a bowl shape is joined to the tube plate 104. The inlet side water chamber 107A is in communication with one end portion of each heat transfer tube 105, and the outlet side water chamber 107B is in communication with the other end portion of each heat transfer tube 105. Furthermore, the inlet side water chamber 107A is formed with an inlet side nozzle 107Aa leading to the outside of the body portion 102, and the outlet side water chamber 107B is formed with an outlet side nozzle 107Ba leading to the outside of the body portion 102. Moreover, the inlet side nozzle 107Aa is connected to a primary cooling water tube 124 (see FIG. 13) to which the primary cooling water is sent from a pressurized water reactor, and the outlet side nozzle 107Ba is connected to the primary cooling water tube 124 (see FIG. 13) that sends the primary cooling water after the heat exchanger to the pressurized water reactor. In addition, the inlet side water chamber 107A and the outlet side water chamber 107B are formed with working manhole 107Ab and 107Bb through which an operator enters the channel head 107 during maintenance and inspection. The manholes 107Ab and 107Bb are normally closed by a lid (not illustrated).

Furthermore, in the upper half portion of the body portion 102, a gas-water separator 109 that separates the water supply into steam and hot water, and a moisture separator 110 that removes the moisture of the separated steam to provide a state close to the dry steam are provided. A water supply tube 111 is inserted between the gas-water separator 109 and the heat transfer tube group 105A, and the water supply tube 111 performs the water supply of the secondary cooling water into the body portion 102 from the outside. Further, at the upper end portion, the body portion 102 is formed with a steam discharge port 112. Further, in the lower half portion, the body portion 102 is formed with a water supply path 113 that allows the secondary cooling water supplied into the body portion 102 from the water supply tube 111 to flow down between the body portion 102 and the tube bundle shroud 103, return back by the tube plate 104, and rise along the heat transfer tube group 105A. In addition, the steam discharge port 112 is connected to a cooling water piping (not illustrated) that sends steam to a turbine, and the water supply tube 111 is connected to a cooling water piping (not illustrated) for supplying the secondary cooling water in which steam used in the turbine is cooled in a condenser (not illustrated).

As illustrated in FIG. 13, the above-described steam generator 101 is applied to a nuclear power apparatus 120. The nuclear power apparatus 120 illustrated in FIG. 13 is a pressurized water reactor (PWR). In the nuclear power apparatus 120, a reactor vessel 121, a pressurizer 122, the steam generator 101, and a pump 123 are sequentially connected by the primary cooling water tube 124, and a circulation path of the primary cooling water is formed. Further, a circulation path of the secondary cooling water is formed between the steam generator 101 and a turbine (not illustrated).

The reactor vessel 121 is formed by a vessel main body 121a and a vessel lid 121b mounted thereon so that a fuel assembly (not illustrated) can be inserted and removed. The vessel lid 121b is provided to be able to open and close with respect to the vessel main body 121a. The vessel main body 121a forms a cylindrical shape in which the upper part thereof opens and the lower part thereof is closed in a hemispherical shape, and an inlet side nozzle 121c and an outlet side nozzle 121d that supply and discharge the light water as the primary cooling water are provided at the top thereof. The outlet side nozzle 121d is connected to the primary cooling water tube 124 so as to communicate with the inlet side nozzle 107Aa of the steam generator 101. Further, the inlet side nozzle 121c is connected to the primary cooling water tube 124 so as to communicate with the outlet side nozzle 107Ba of the steam generator 101.

In the nuclear power apparatus 120, the primary cooling water is heated by the reactor vessel 121 to enter a high-pressure and high-temperature state, and the primary cooling water is supplied to the steam generator 101 via the primary cooling water tube 124 while being maintained at a constant pressure by being pressurized by the pressurizer 122. In the steam generator 101, the heated primary cooling water is sent to the inlet side water chamber 107A, circulates through the large number of heat transfer tubes 105, and reaches the outlet side water chamber 107B. Meanwhile, the secondary cooling water cooled by the condenser is sent to the water supply tube 111, and rises along the heat transfer tube group 105A through the water supply path 113 in the body portion 102. At this time, within the body portion 102, heat is exchanged between the high-pressure and high-temperature primary cooling water and the secondary cooling water. Moreover, the cooled primary cooling water is returned to the pressurized water reactor from the outlet side water chamber 107B. Meanwhile, the secondary cooling water subjected to heat exchange with the high-pressure and high-temperature primary cooling water rises in the body portion 102, and is separated into the steam and the hot water in the gas-water separator 109. The separated steam is sent to the turbine from the steam discharge port 112 after the moisture is removed by the moisture separator 110. The turbine is driven by steam of the secondary cooling water. Moreover, the power of the turbine is transmitted to a generator (not illustrated) to generate electricity. The steam supplied to driving of the turbine is supplied to the steam generator 101, by being condensed and converted into water. Meanwhile, the primary cooling water after the heat exchange in the steam generator 101 is collected to the pump 123 side via the primary cooling water tube 124.

Meanwhile, in order to maintain the integrity of the heat transfer tube 105, the inlet side nozzle 107Aa, and the outlet side nozzle 107Ba, maintenance is periodically performed on the above-described steam generator 101. At the time of maintenance, the primary cooling water is withdrawn from the inlet side water chamber 107A and the outlet side water chamber 107B, and a worker enters the inlet side water chamber 107A and the outlet side water chamber 107B from the manholes 107Ab and 107Bb. However, as illustrated in FIGS. 11 and 12, the channel head 107 is formed in a bowl shape, and the manholes 107Ab and 107Bb and each of the nozzles 107Aa and 107Ba are formed obliquely with respect to the channel head 107. For that reason, in some cases, the primary cooling water remains in the bowl-shaped bottom of the channel head 107, or the primary cooling water remains in the lids of the manholes 107Ab and 107Bb. Therefore, the channel head 107 is formed with a drain hole 1 leading to the bottom side of the channel head 107 from the manholes 107Ab and 107Bb, and the drain hole 1 leading to the nozzles 107Aa and 107Ba from the bottom of the channel head 107.

Figure 1:
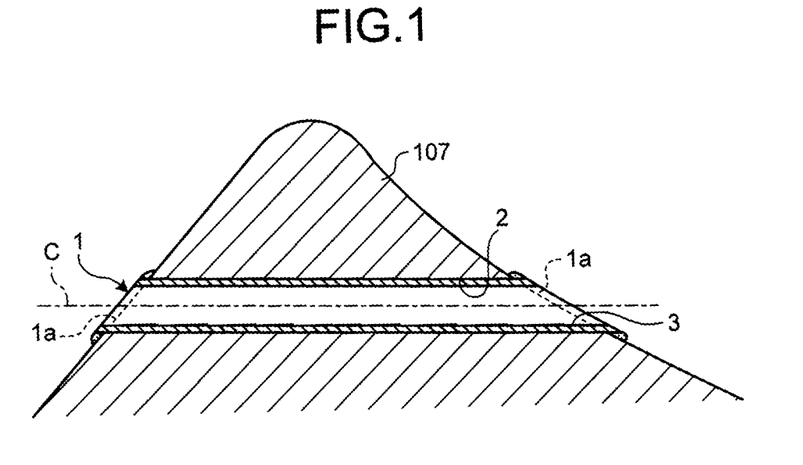
FIG. 1 is an explanatory view of a drain hole formed by a tube expansion method according to an embodiment of the present invention.

FIG. 1 is an explanatory view of the drain hole formed by the tube expansion method according to the present embodiment, and FIGS. 2 to 9 are process diagrams of the tube expansion method according to the present embodiment.

As illustrated in FIG. 1, the drain hole 1 is configured so that a drain tube 3 as a tube member made of a corrosion-resistant material is inserted and mounted to a through hole 2 formed in the channel head 107 in consideration of corrosion resistance. Since the channel head 107 is formed in a bowl shape, and the manholes 107Ab and 107Bb and the nozzles 107Aa and 107Ba are formed obliquely with respect to the channel head 107, an opening portions 1a at both ends of the drain hole 1 are oblique to the axis center C to conform to the oblique shape. Moreover, the end portions of the drain tube 3 are welded to the opening portions 1a of the drain hole 1.

Figure 2:
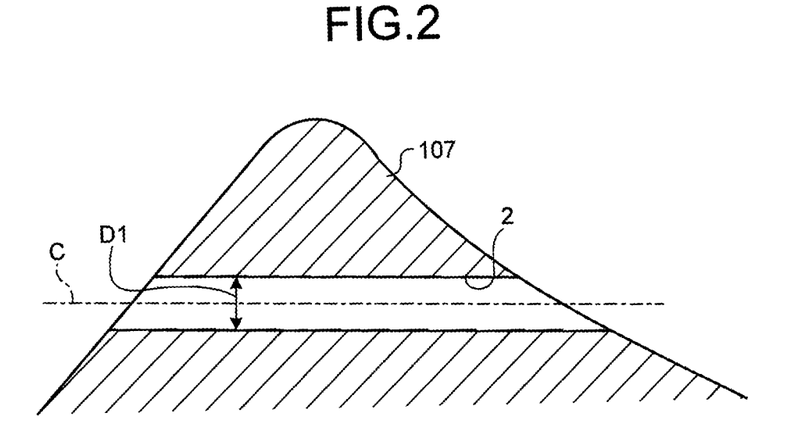
FIG. 2 is a process diagram of the tube expansion method according to the embodiment of the present invention.

When providing such a drain hole 1, first, as illustrated in FIG. 2, the through hole 2 is provided on the channel head 107 as a base material along the axis center C of the completed drain hole 1. Since the opening portion of the through hole 2 is an opening portion 1a of the drain hole 1, the opening portions at both ends are formed obliquely with respect to the axis center C. Further, for insertion of the drain tube 3, an inner diameter D1 of the through hole 2 is formed to be slightly greater than an outer diameter D2 (see FIG. 3) of the drain tube 3. Thus, the inner diameter D1 of the through hole 2, and the outer diameter D2 and an inner diameter D3 (see FIG. 3) of the drain tube 3 are measured here (measurement step).

Figure 3:
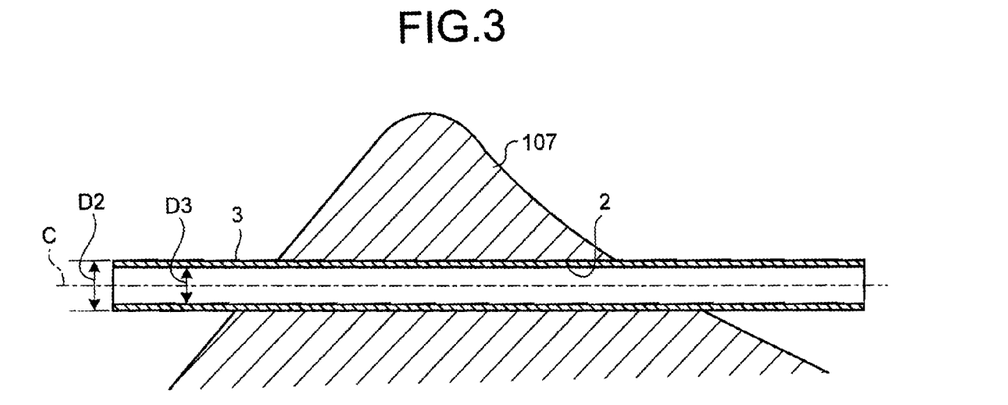
FIG. 3 is a process diagram of the tube expansion method according to the embodiment of the present invention.

Next, as illustrated in FIG. 3, the drain tube 3 is inserted to the through hole 2 (insertion step). The drain tube 3 has a long length in the axis center C direction of the through hole 2, and for that reason, the end portion of the drain tube 3 is disposed to protrude from the opening portion at both ends of the through hole 2.

Figure 4:
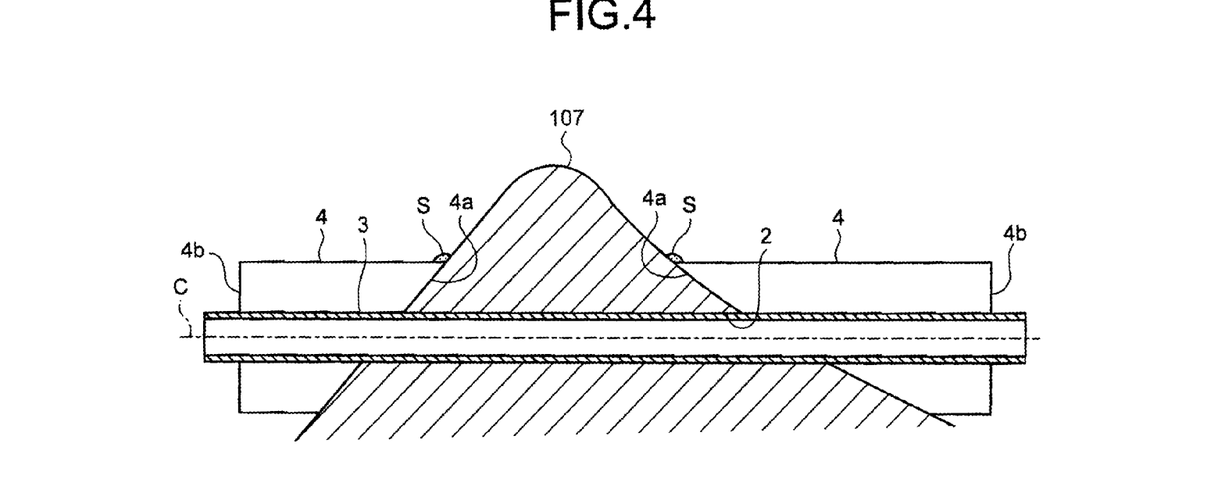
FIG. 4 is a process diagram of the tube expansion method according to the embodiment of the present invention.
Figure 5:
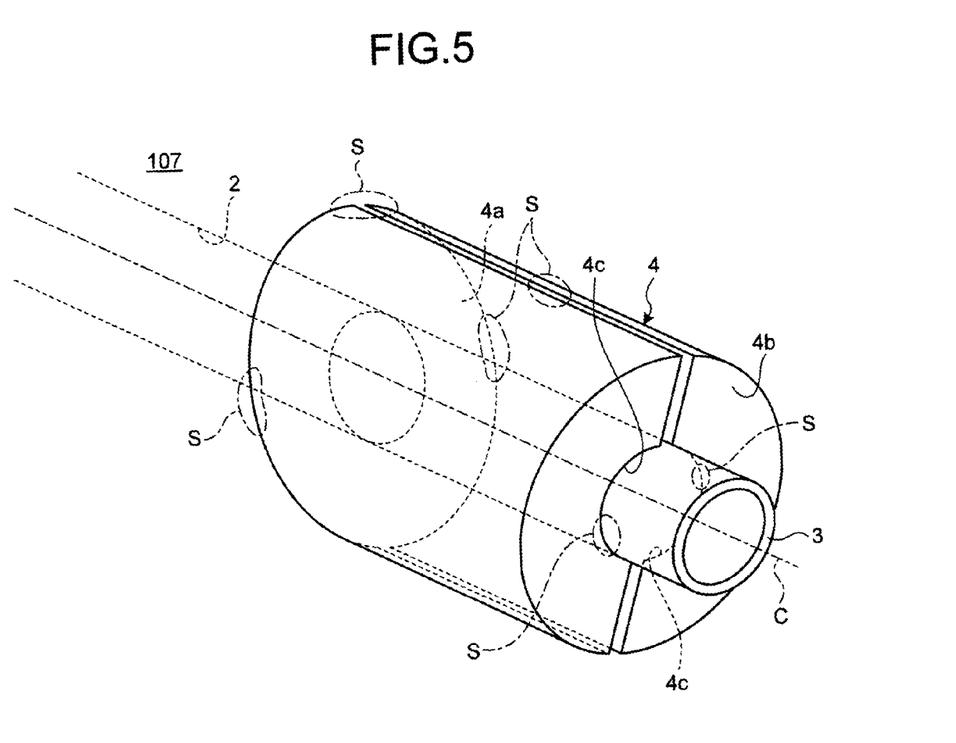
FIG. 5 is a process diagram of the tube expansion method according to the embodiment of the present invention.
Figure 6:
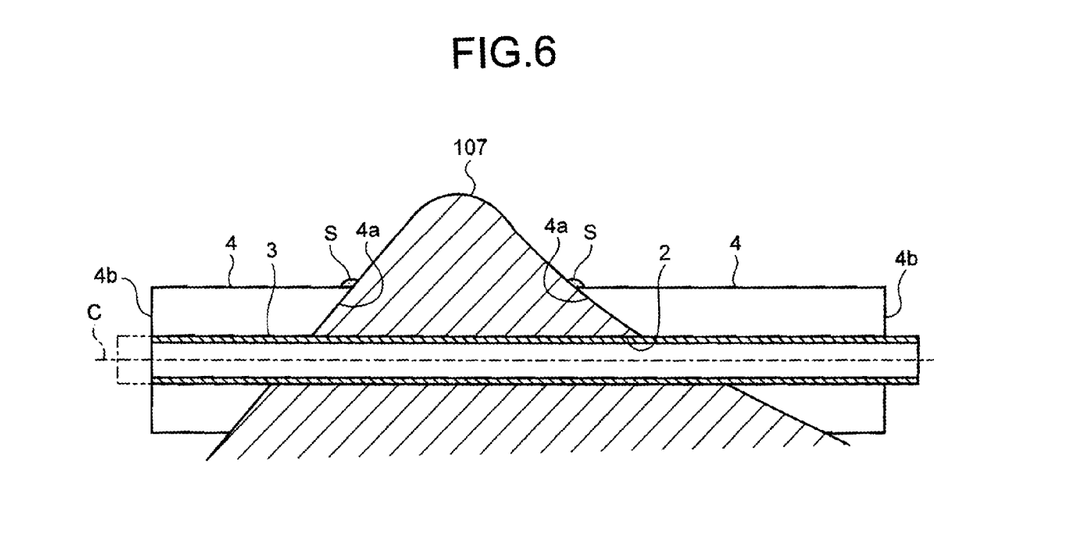
FIG. 6 is a process diagram of the tube expansion method according to the embodiment of the present invention.

Next, as illustrated in FIGS. 4 and 5, the end portions of the drain tube 3 protruding from each opening portion of the through hole 2 are fixed (fixing step). Specifically, a fixing jig 4 is used. The fixing jig 4 is configured so that one end surface 4a fits the oblique shape of the opening portion of the through hole 2, the other end surface 4b is orthogonal to the axis center C, and the end portions of the drain tube 3 protruding from each opening portion of the through hole 2 are inserted through the fixing jig 4. In this embodiment, as illustrated in FIG. 5, the fixing jig 4 forms a cylindrical shape as a whole, is divided across the axis center C, and is formed to have recessed portions 4c that interpose the end portions of the drain tube 3 protruding from each opening portion of the through hole 2. Moreover, in a state in which one end surface 4a fits the oblique shape of the opening portion of the through hole 2, and the end portions of the drain tube 3 are pressed by a vise or the like so as to be interposed by the recessed portions 4c, the fixing jig 4 is fixed to the channel head 107 side as an opening edge of the through hole 2 by spot welding S. Moreover, as illustrated in FIG. 6, at least one end portion of the drain tube 3 to which a tube expander 5 to be described later is inserted is cut so that the end surface of the drain tube 3 fits the other end surface 4b of the fixing jig 4. In consideration of easiness of construction, it is preferred to insert the tube expander 5 from the outside of the channel head 107, and for this reason, the end portion of the drain tube 3 to be cut is assumed to an the outer side of the channel head 107 (the nozzles 107Aa and 107Ba side and the manholes 107Ab and 107Bb side). Further, as illustrated in FIG. 5, the end portion of the drain tube 3 is fixed to at least the other end surface 4b of one fixing jig 4 by the spot welding S. Thus, the end portions of the drain tube 3 protruding from each opening portion of the through hole 2 are fixed. In addition, when the end portion of the drain tube 3 is fixed to the other end surface 4b of the one fixing jig 4 by the spot welding S, one of the one end portion side of the drain tube 3 that has been cut as described above, or the other end portion side of the drain tube 3 that has not been cut may be fixed.

In addition, in the case of not using the fixing jig 4, in a tube expansion step to be described later, a worker manually fixes the end portions of the drain tube 3 protruding from each opening portion of the through hole 2 by pliers.

Figure 7:
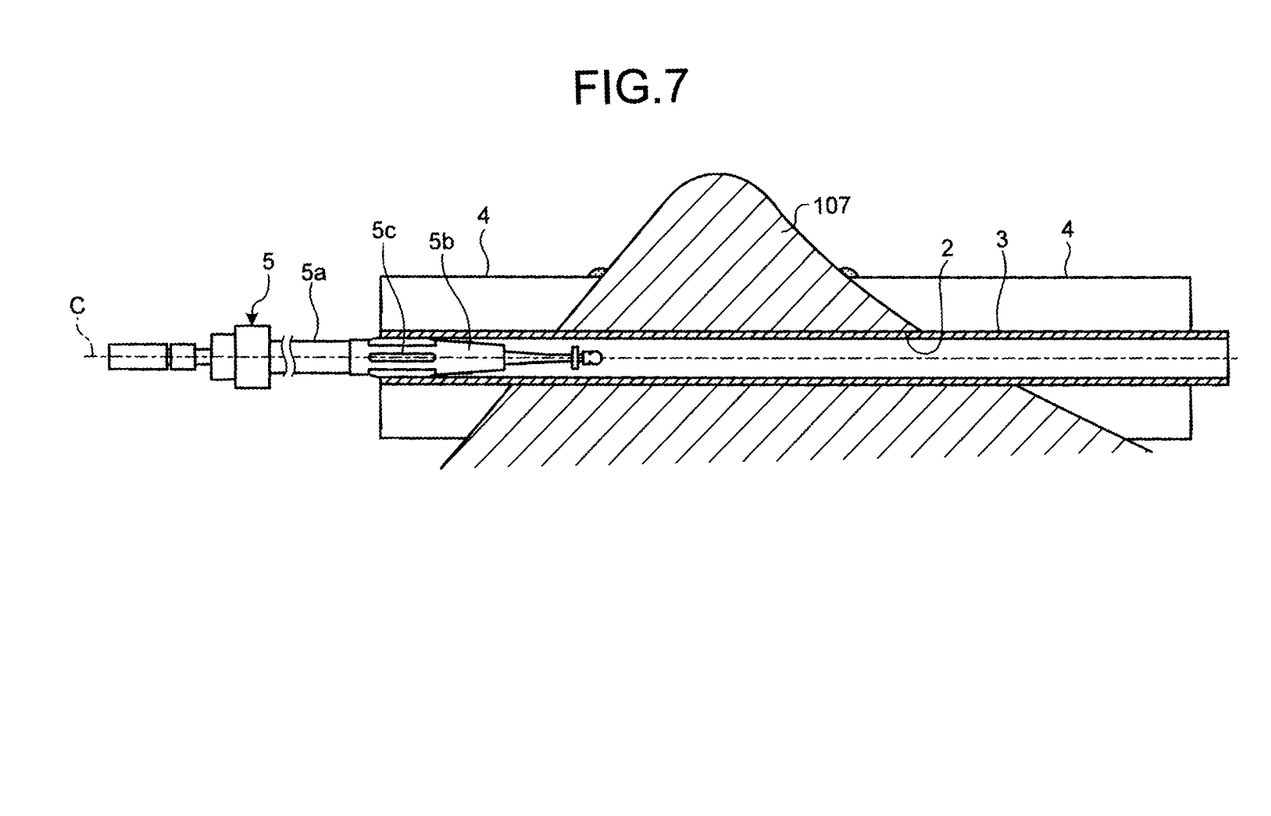
FIG. 7 is a process diagram of the tube expansion method according to the embodiment of the present invention.
Figure 8:
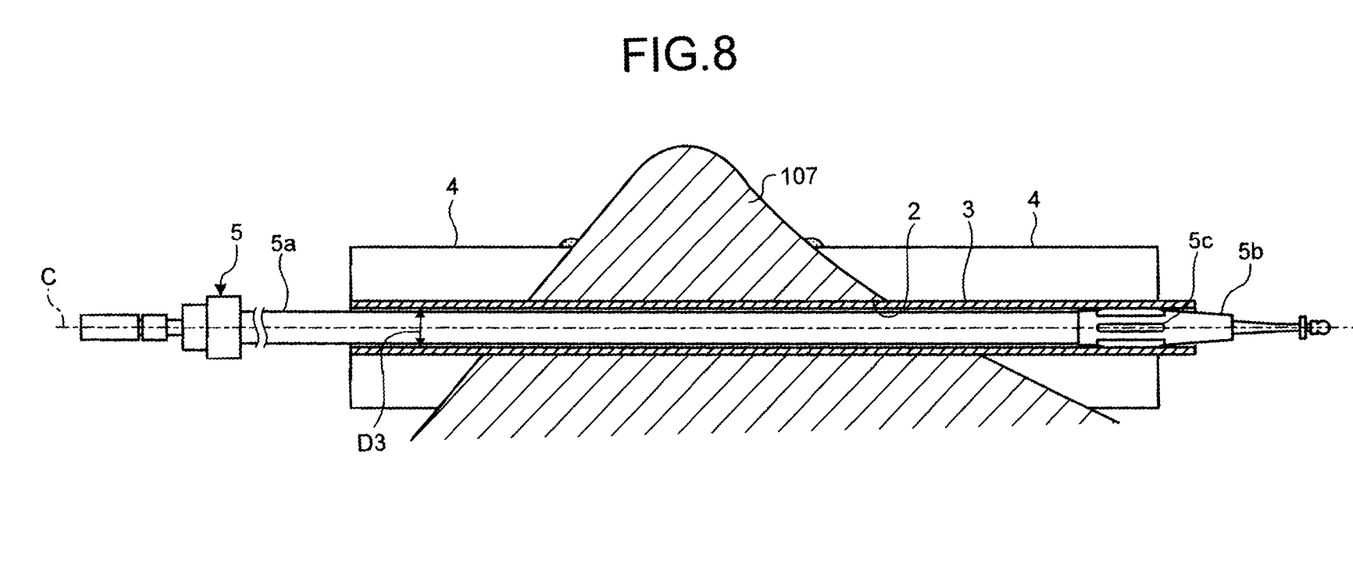
FIG. 8 is a process diagram of the tube expansion method according to the embodiment of the present invention.

Next, as illustrated in FIGS. 7 and 8, the tube expander 5 is inserted into the drain tube 3, and the drain tube 3 is expanded up to a predetermined inner diameter while moving the tube expander 5 to the other end portion from one end portion of the drain tube 3 (tube expansion step). The tube expander 5 is provided with a gauge 5b, at a leading end portion of a mandrel 5a having a length that can be inserted into the other end portion from one end portion of the drain tube 3. A roller 5c is mounted to the periphery of the mandrel 5a in a revolvable and rotatable manner. Moreover, by inserting the roller 5c of the mandrel 5a to one end portion of the drain tube 3 to give a rotational torque from the base end side of the rotary shaft 5a, the roller 5c revolves and rotates to apply the tube expansion force to the drain tube 3 and move the mandrel 5a in the axis center C direction. Further, since the leading end of the mandrel 5a has a tapered shape, an amount of projection in the radial direction of the roller 5c changes by the movement in the axis center C direction, and the tube expansion force to the drain tube 3 is obtained accordingly to expand the drain tube 3. That is, in the tube expansion process, the amount of projection in the radial direction of the roller 5c is adjusted depending on the inner diameter D1 of the through hole 2, and the outer diameter D2 and the inner diameter D3 of the drain tube 3 measured as described above, thereby setting the tube expansion diameter of the drain tube 3.

Furthermore, in the tube expansion step, after the tube expansion, the inner diameter D3 of the drain tube 3 is measured, and it is checked whether the drain tube 3 becomes a predetermined tube expansion diameter so that the outer surface of the drain tube 3 suitably comes into contact with the inner surface of the through hole 2, depending on the inner diameter D1 and the outer diameter D2 of the drain tube 3 of the through hole 2 measured in advance (checking step). Moreover, if the drain tube 3 does not have a predetermined tube expansion diameter, by changing the amount of projection in the radial direction of the roller 5c in the tube expander 5, the tube expansion is repeated until the drain tube 3 has a predetermined tube expansion diameter.

Figure 9:
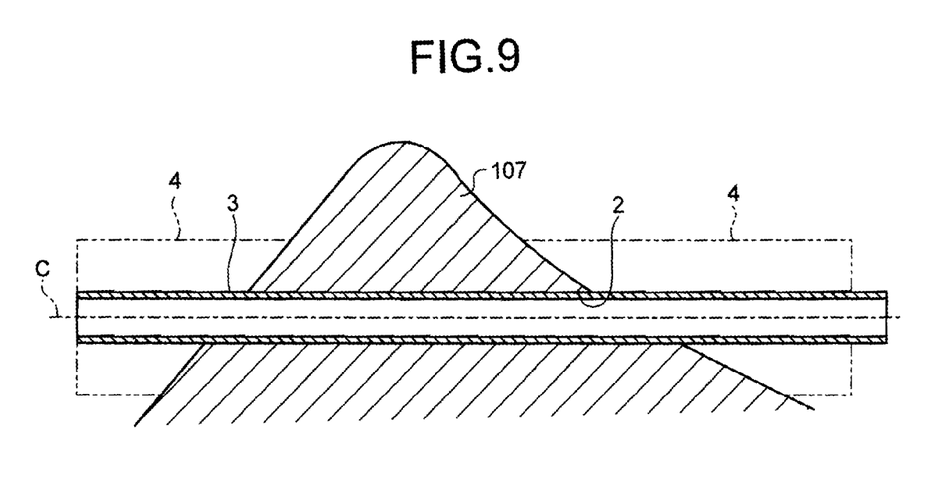
FIG. 9 is a process diagram of the tube expansion method according to the embodiment of the present invention.

Next, as illustrated in FIG. 9, fixing of the drain tube 3 is released by detaching the fixing jig 4. Further, as illustrated in FIG. 1, the end portion of the drain tube 3 protruding from each opening portion of the through hole 2 is cut along the oblique shape of each opening portion of the through hole 2 (cutting step). Next, the opening edge of the through hole 2 is welded to weld the end portion of the drain tube 3 and the opening portion of the through hole 2 (welding step). In addition, in the cutting step, in consideration of welding of the subsequent welding step, an extra length is provided so that the end portion of the drain tube 3 leaves from the welding surface by several millimeters. Moreover, after the welding step, the drain hole 1 is completed by cutting the extra length of the drain tube 3 by a grinder, and by performing finishing to fit the oblique shape of the channel head 107 so that the sharp projecting portion does not remain.

Thus, according to the present embodiment, there is provided a tube expansion method of mounting the drain tube 3 as a tube member by insertion and expansion to the through hole 2 in which the opening portions at both ends are obliquely formed, the method including: an insertion step of inserting the drain tube 3 to the through hole 2 so that the end portion protrudes from the opening portions at both ends of the through hole 2, next, a tube expansion step of inserting the tube expander 5 into the drain tube 3 to expand the drain tube 3 to a predetermined inner diameter while moving the tube expander 5 to the other end portion from one end portion of the drain tube 3, next, a cutting step of cutting each end portion of the drain tube 3 protruding from each opening portion of the through hole 2 along the oblique shape of each opening portion, and next, a welding step of welding the cut end portion of the drain tube 3 and the opening portion of the through hole 2.

According to the tube expansion method, by performing the tube expansion using the tube expander 5 in the state of projecting the end portion of the drain tube 3 from the opening portions at both ends of the through hole 2, it is possible to apply the tube expansion force of uniformly expanding in the radial direction to the drain tube 3 inserted to the through hole 2 having the opening portion of the oblique shape with respect to the axis center C. As a result, it is possible to expand the drain tube 3 inserted into the through hole 2 having the opening portion of the oblique shape with respect to the axis center C in a suitable state.

Further, the tube expansion method according to the present embodiment includes a fixing step of fixing at least one end portion of the drain tube 3 protruding from each opening portion of the through hole 2 between the insertion step and the tube expansion step.

According to the tube expansion method, it is possible to prevent a situation in which the drain tube 3 is moved by the rotational force of the tube expander 5 and the driving force in the axis center C direction during the tube expansion.

In addition, according to the tube expansion method of the present embodiment, in the fixing step, one end surface 4a fits the oblique shape of the opening portion of the through hole 2, the other end surface 4b is orthogonal to the axis center C of the through hole 2, the one end surface 4a of the fixing jig 4 is welded to the opening edge side of the through hole 2, and the drain tube 3 is welded to the other end surface 4b side of the fixing jig 4, by using the fixing jig 4 to which the end portion of the drain tube 3 protruding from each opening portion of the through hole 2 is inserted.

According to this tube expansion method, it is possible to suitably fix the drain tube 3 using the fixing jig 4.

Further, according to the tube expansion method of this embodiment, the fixing jig 4 is dividedly formed so as to interpose the end portions of the drain tube 3 protruding from each opening portion of the through hole 2, and the drain tube 3 is welded to the opening edge side of the through hole 2 while interposing the drain tube 3 between the divided fixing jig 4.

According to the tube expansion method, even if there is a dimensional error in the diameter of the drain tube 3, it is possible to easily perform the arrangement of the fixing jig 4 with respect to the drain tube 3.

Further, according to the tube expansion method of the present embodiment, in the fixing step, the other end surface 4b of the fixing jig 4 is fitted to the end surface of one end portion of the drain tube 3 to which the tube expander 5 is inserted.

According to the tube expansion method, since all the portions of the drain tube 3 protruding from the through hole 2 are pressed by the fixing jig 4, it is possible to prevent a situation in which one end portion of the drain tube 3 is deformed during the tube expansion using the tube expander 5, and it is possible to smoothly move the tube expander 5 along the axis center C. As a result, it is possible to obtain a considerable effect of expanding the drain tube 3 in a suitable state.

REFERENCE SIGNS LIST

1 DRAIN HOLE
1a OPENING PORTION
2 THROUGH HOLE
3 DRAIN TUBE (TUBE MEMBER)
4 FIXING JIG
4a ONE END SURFACE
4b THE OTHER END SURFACE
4c RECESSED PORTION
5 TUBE EXPANDER
5a Mandrel
5b GAUGE
5c ROLLER
C AXIS CENTER
D1 INNER DIAMETER OF THROUGH HOLE
D2 OUTER DIAMETER OF DRAIN TUBE
D3 INNER DIAMETER OF DRAIN TUBE

The invention claimed is:

1. A tube expansion method of mounting a tube member, by insertion and expansion, to a through hole in which opening portions at both ends are formed obliquely with respect to an axis center, the method comprising:
   an insertion step of inserting the tube member to the through hole so that end portions protrude from the opening portions at both ends of the through hole;
   a tube expansion step of inserting a tube expander into the tube member to expand the tube member up to a predetermined inner diameter while moving the tube expander to the other end portion from one end portion of the tube member;
   a cutting step of cutting each of the end portions of the tube member protruding from each of the opening portions of the through hole along an oblique shape of each of the opening portions; and
   a welding step of welding the cut end portions of the tube member and the opening portions of the through hole.

2. The tube expansion method according to claim 1, further comprising:
   a fixing step of fixing at least one end portion of the tube member protruding from each opening portion of the through hole, between the insertion step and the tube expansion step.

3. The tube expansion method according to claim 2, wherein, in the fixing step, one end surface fits the oblique shape of the opening portion of the through hole, the other end surface is orthogonal to the axis center of the through hole, and
   by using a fixing jig to which the end portions of the tube member protruding from each opening portion of the through hole are inserted, one end surface of the fixing jig is welded to an opening edge side of the through hole, and the tube member is welded to the other end surface side of the fixing jig.

4. The tube expansion method according to claim 3, wherein the fixing jig is dividedly formed so as to interpose the end portions of the tube member protruding from each opening portion of the through hole, and the tube member is welded to the opening edge side of the through hole while interposing the tube member between the divided fixing jig.

5. The tube expansion method according to claim 3, wherein, in the fixing step, the other end surface of the fixing jig is fitted to the end surface of one end portion of the tube member to which the tube expander is inserted.

\* \* \* \* \*